Dec. 25, 1962  R. J. STRAND  3,070,784
ALARM SYSTEM FOR PARKING METERS
Filed Oct. 27, 1960  2 Sheets-Sheet 1

INVENTOR.
Robert J. Strand
BY *Wells & St. John*
ATTYS

Dec. 25, 1962 R. J. STRAND 3,070,784
ALARM SYSTEM FOR PARKING METERS
Filed Oct. 27, 1960 2 Sheets-Sheet 2
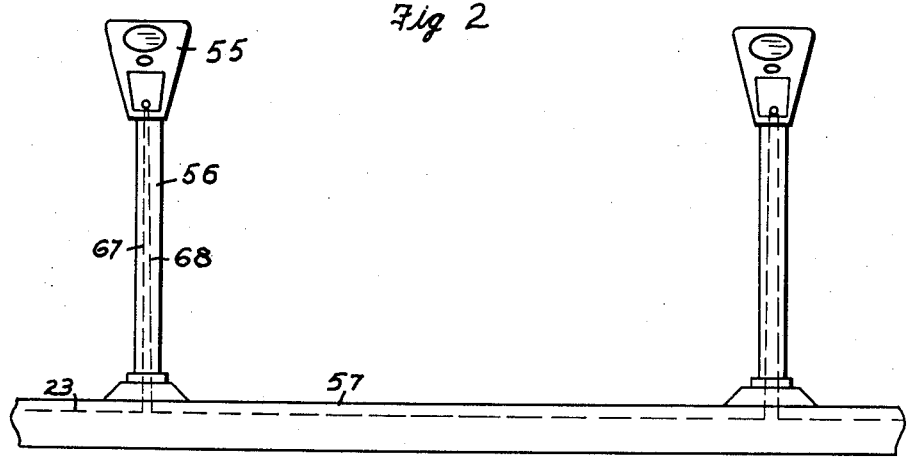
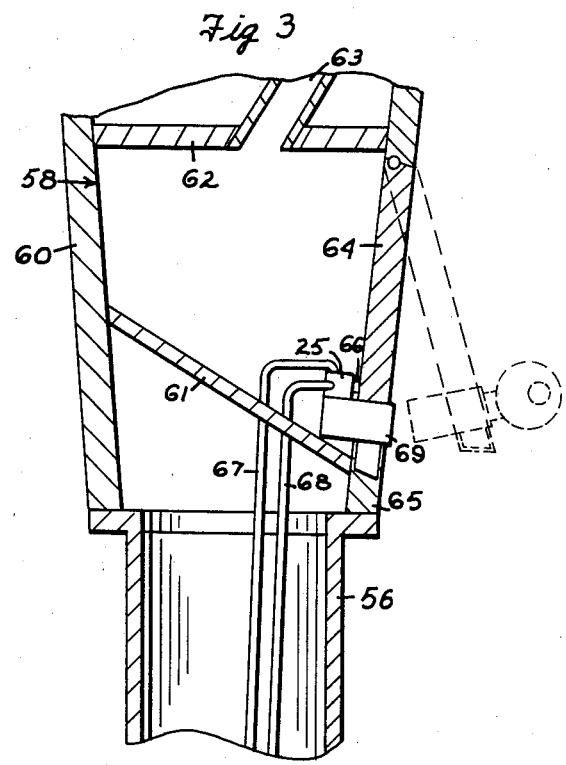
INVENTOR.
Robert J. Strand
BY *Wells & St. John*
ATTYS.

United States Patent Office 3,070,784
Patented Dec. 25, 1962

3,070,784
ALARM SYSTEM FOR PARKING METERS
Robert J. Strand, 4605 Maple St., Spokane 13, Wash.
Filed Oct. 27, 1960, Ser. No. 65,481
8 Claims. (Cl. 340—274)

This invention relates to a novel alarm system for parking meters. The instant alarm system is particularly devised to protect parking meters on streets and parking lots of modern cities.

In recent years an increasing problem has been posed by parking meters used in city streets due to the fact that such meters are subject to easy robbery by a person having a key to the meter coin box. Protection of these many meters in a large modern city is almost impossible for patrolmen using human surveillance alone. In order to meet this problem the instant invention proposes an automatic alarm system to protect and guard meters in a given block or area and to give an indication of the opening of any meter in that area. Such a system is designated for central operation having the controls located in a convenient location such as the radio station of the police precinct.

It is a first object of this invention to provide an alarm system for parking meters which cannot be tampered with and will always operate each time a meter in the area is opened. A meter system according to this invention is designed to set off a signal any time a meter is opened, no matter how slightly or quickly.

Another object of this invention is to provide a meter alarm system which will give an indication, to an observer, of activity in the field. That is, it will give an indication of each meter being opened and closed simultaneously with each occurrence. In this manner police officers will be able to know where the activity is taking place at any instant and will be able to pinpoint the time that the activity ceases. This will be effective in providing a pattern of operation by which radio controlled patrol cars can be used to pick up those looting the meters.

It is another object of this invention to provide a meter alarm system which can be tested by a central monitoring official at any time. This is accomplished by using a closed circuit in the meters to provide a constant test circuit that can be opened by a central control to test the meter alarm when desired. In this manner the operation of the system can be carefully scrutinized and checked at any instant. In most operations such a check would be necessary every morning in order to assure that the meter alarm system is in operation.

It is a final object of this invention to provide a meter alarm system for a plurality of parking meters in various areas with separate indicators to identify activity in each area and other indicators used to show repeated activity within the area. In this way the area of operation as well as the continuance of activity within the area can be spotted by the central control monitor.

These and further objects of the invention will be evident from a study of the following specification taken in conjunction with the three figures of the drawings which show a particular embodiment of the invention. This embodiment is merely exemplary and is typical of the installations possible within the purview of this invention. However, the invention is not to be limited or restricted by this description except as it is defined by the annexed claims.

In the drawings:

FIGURE 2 is a somewhat diagrammatic view of two meters located on a street with detecting wires for the meter alarm circuit shown in dashed lines; and FIGURE 3 is a broken away vertical sectional view of the coin box of one meter on an enlarged scale, the open position of the door being shown in dashed lines.

Figure 1:
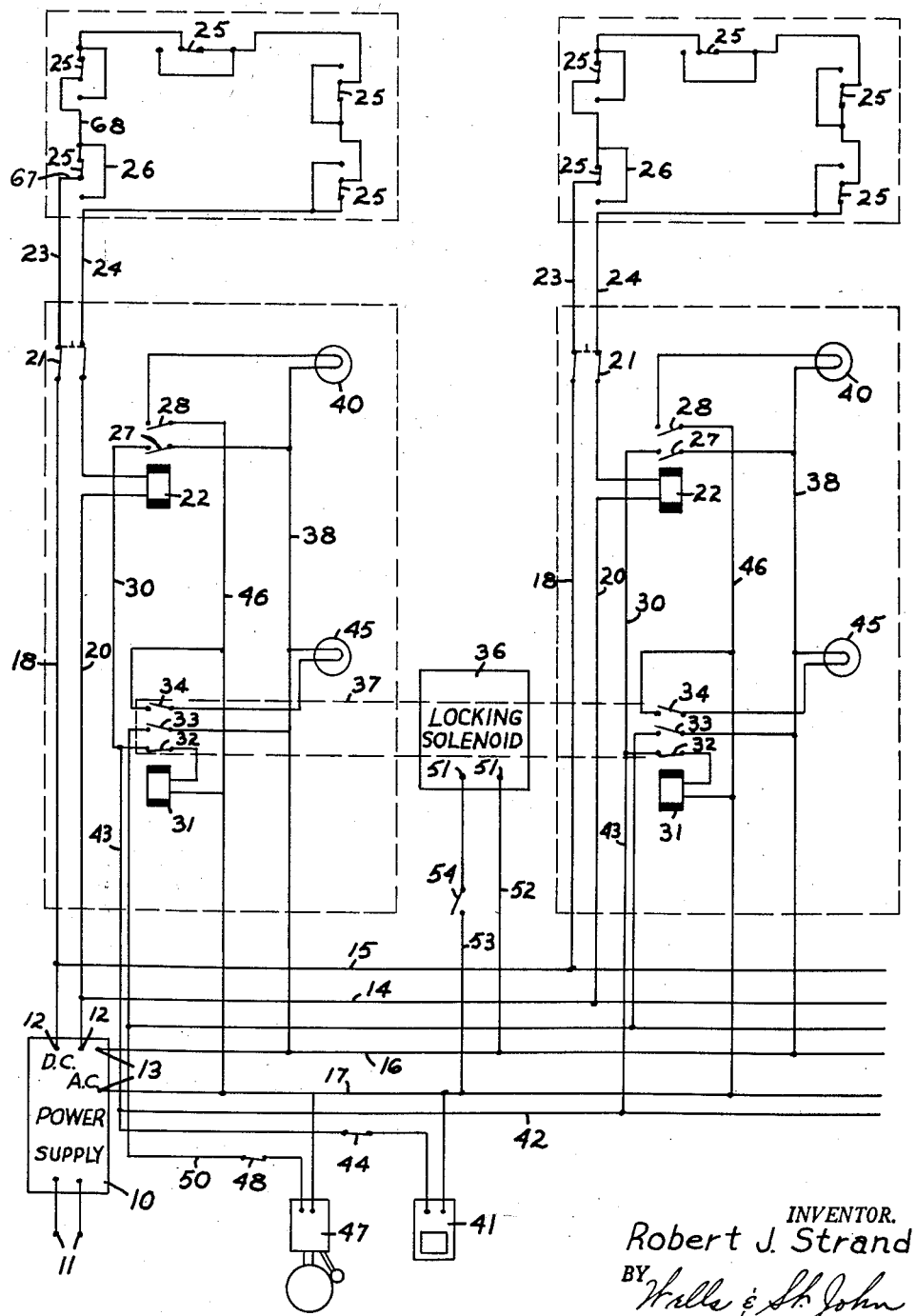
FIGURE 1 is a circuit diagram of the meter system showing the alarm circuit for two areas, each area having five meters therein.

Referring now to the drawings, the invention is best seen in the circuit diagram shown in FIGURE 1. This circuit diagram shows the circuits for two distinct areas of meter operations. Obviously the number of meter areas which could be monitored by a central control is unlimited and may be any number desired. For convenience, two areas have been shown in the diagram of FIGURE 1.

The power for the meter alarm systems is derived from an A.C.-D.C. power supply 10 which is connected by terminals 11 to any suitable source of electrical energy. Power supply 10 is of common design and has two sets of outlet terminals. The first two terminals of power supply 10 are designated by the numeral 12 and are a source of direct current. The second set of terminals 13 are a source of alternating current. The voltage and current of terminals 12 and 13 may be chosen to meet the design of the circuit. Terminals 12 are connected to two main electrical lines 14 and 15 which are common direct current conductors used for each area of meter operation. In like manner terminals 13 are connected to alternating current conductors 16 and 17. These conductors 14 through 17 are shown broken off on the right hand side of FIGURE 1 and are understood to extend throughout the central wiring of the meter circuit.

*The Primary Circuit*

Since each parking meter area is protected by an identical meter alarm system and circuit, identical numbers will be used to designate the identical components of each circuit. Thus the left and right hand sides of the circuit in FIGURE 1 are numbered identically. Each circuit includes a primary circuit which is composed of a first line 18 connected to line 15 of the D.C. current conductors and a second line 20 which is connected to line 14 of the D.C. conductors. Line 18 is directly connected to one of the terminals of a double pole single throw switch 21. Line 20 is directly connected to a first relay 22 whose remaining terminal is connected to the remaining terminal of the switch 21. The switch 21 is connected by two wires 23 and 24 to a series of five single pole double throw switches 25. Each switch 25 has a central armature connected in series to the adjacent switch 25. The two outer contacts which are alternately electrically connectable to the armature of the switch 25 are wired together by short shunt wires 26. Thus the current path of each switch 25 will be opened and closed in rapid succession each time a switch 25 is operated. Since all the switches 25 are in series, any one switch 25, when opened, will result in the primary circuit being opposed. The switch 21 is a manual test switch which will be located in a central control office as will all the components of the circuit shown below the areas of switches 25. Thus the primary circuit is a normally closed circuit, including the switches 25 which will be described later.

The Secondary Circuit

The central circuit also includes a normally open secondary circuit. This circuit includes normally closed contacts 27 of relay 22 and a second relay 31. Relay 31 is wired to contacts 27 by a line 30 and its own normally closed contacts 32. Relay 31 is a holding relay whose contacts 32, 33 and 34 are held in their operative position when relay 31 is activated by a mechanical holding system generally designated by the numeral 36. As shown in FIGURE 1, contact points 32 are normally closed, while contact points 33 and 34 are normally open. Such relays are conventionally designed and are readily purchased from electrical suppliers. Since many different designs of relays such as these may be substituted in this invention, the holding mechanism for interlock 36 will not be further described. The interlock 36 may be an individual interlock for each relay 31 or may be a common interlock system for all the relays 31, as diagrammatically shown by dash lines 37. Relay 31 has its first terminal wired to contacts 32. The remaining terminal of relay 31 is connected to the alternating current conductor 17. The remaining terminal of contact 27 is wired by means of a conductor 38 to the remaining alternating current conductor 16. Thus the secondary circuit consists of a normally opened circuit since relay 22 is normally activated and opens contact 27. It should be obvious that when the primary circuit is opened and relay 22 is released that contacts 27 will close and thereby close the secondary circuit completing an alternating current circuit to relay 31.

The First Indicator Circuit

The present invention includes two indicator circuits. The first of these is designated to show individual activity at each meter, either by a light or buzzer or other audible sound. The second indicator system is a holding system to give a permanent indication of meter looting. This system is maintained in effect when activated by the interlock system 36. It also may consist of a light, buzzer, bell or other audible or visible indicator mechanism.

The first indicator circuit shown in the diagrams controls a light 40 which flashes each time a switch 25 is opened. The lamp 40 is wired by a line 38 to the line 16 and by contacts 28 of relay 22 to the remaining A.C. line 17. Wired in parallel with lamp 40 is a buzzer 41 which is connected by a common connecting line 42 to line 30 by means of a conductor 43. Interposed between the buzzer 41 and the conductor 42 is a switch 44. Switch 44 is a single pole, single throw switch used to temporarily disconnect the buzzer 41 from operation. The remaining terminal of buzzer 41 is connected to the A.C. conductor 17 to complete the alternating current circuit for the buzzer 41. Thus each time that relay 22 is deactivated both contacts 27 and 28 will close, thereby activating lamp 40 and buzzer 41. Since the relay 22 is normally deactivated by opening of switches 25, this period of operation is quite short.

The Second Indicator Circuit

A second indicator circuit is used to light a lamp 45 which remains lit during the total sequence of operation. Lamp 45 is wired by contacts 34 to a line 46 connected to the A.C. conductor 17. The remaining terminal of lamp 45 is directly connected to line 38 and therefore to conductor 16 to complete the A.C. circuit for the lamp 45. Wired in parallel with lamp 45 is a bell 47 at the lower portion of the diagram in FIGURE 1. Bell 47 has one terminal directly connected to conductor 17 and its remaining terminal is connected by a switch 48 and a wire 50 to one side of the contacts 33 of relay 31. The remaining side of contacts 33 is connected to line 38 and therefore to conductor 16 to complete the A.C. circuit for the bell 47. Switch 48 is also a single pole, single throw switch similar to switch 44 and is used to temporarily disconnect the circuit of bell 47.

Mechanical interlock 36 has an operating solenoid (not shown) which is controlled through two terminals 51 which are connected by lines 52 and 53 to the A.C. conductors 16 and 17. Line 53 is interrupted by a normally opened single pole, single throw switch 54. When switch 54 is opened the interlock 36 acts to lock contacts 32, 33 and 34 in their active positions upon activation of relay 31. Each time the switch 54 is closed by manual operation the interlock 36 is released by the electrical solenoid therein to return switch contacts 32, 33 and 34 to their normal positions. This completes the description of the control circuits.

Operation

The operation of the circuits is quite simple. In their normal position switches 25 are closed as shown in FIGURE 1. Switches 25 are mounted individually in each meter in a given area of a block or district, as will be described presently. Each time that a meter is opened a switch 25 will momentarily open and then close as the actuating arm thereof is moved from one contact to the other of the switch 25. This momentary opening of the primary circuit will result in relay 22 being momentarily released. This will return contacts 27 and 28 to their normally closed position, thereby completing the secondary circuit and the two indicator circuits. Closing of relay contacts 27 results in completion of the circuit to relay 31. Relay 31 therefore opens contacts 32, thereby opening its own circuit to prevent damage to the coil of relay 31. At the same time, contacts 33 and 34 are closed. Contacts 32 are held in their open position and contacts 33 and 34 are held in their closed position by mechanical interlock 36. The contact 34 completes the circuit to lamp 45 while the contact 28 completes the circuit to the lamp 40. At the same time contacts 27 complete the circuit to buzzer 41 and contacts 33 complete the circuit to bell 47. As soon as switch 25 is again closed after its momentary opening, the lamp 40 and buzzer 41 will be deactivated by the openings of contacts 28 and 27 respectively. However, due to the mechanical interlock 36, the lamp 45 will remain lighted and bell 47 will continue to ring. This signal will continue until the operator releases the interlock 36 by closing switch 54.

In order to fully understand the working of this circuit it is necessary to review the operations of those who loot parking meters. Ordinarily such thieves work extremely fast, using keys which fit the locks of the meters. They insert the key into the meter box, quickly flip open the door, collect the coins, and quickly shut the meter door. The entire operation takes less than a second. They normally move from meter to meter along an entire block or through a parking lot. The circuit described is primarily designed to pin point action in such an event. As each switch 25 is opened and closed, the lamp 40 and the buzzer 41 will be activated. This will tell the operator that there is present activity in the locality. The specific locality will be identified by the lamp 45 which will tell the operator exactly which area is being looted. The bell 47 will sound an audible alert in cases where no monitor is watching the control board at the time of the action. Thus the operator of the central controls will be in a position to know just where the looting is taking place and whether it is continuing. If the central control is located at a radio station the operator is in a good position to direct patrol cars closing in on the meter area.

The Meter Switches

The general manner of wiring a meter is shown in FIGURES 2 and 3. The meters 55 are mounted on posts 56 held on a sidewalk 57. Such mountings are customary and will not be further explained. Each meter 55 has the coin box generally designated at 58. This coin box 58 is mounted by the walls 60 of the meter and by a sloping floor 61 and a ceiling 62, through which coins fall by means of a slot 63. A door 64 is provided on the meter and is adapted to be locked to housing 65 by a lock mechanism generally shown at 69. The door 64 is hinged at 66 and opened from the bottom in this example. It is to be understood that the meter shown in FIGURES 2 and 3 is merely a diagrammatic showing and is not intended to show the specific arrangement of any particular parking meter. The construction of the meter is unimportant. It is the location of the switch 25 which is of importance in this case. Switch 25, as shown in FIGURE 3, is mounted on one of the walls 60 of the meter and has its operating button 66 in contact with door 64 when the door 64 is closed. If door 64 is opened, as shown in dash line in FIGURE 3, the operating button 66 will be moved to its extended position which will move the armature of switch 25 from one contact to the other. The important thing to be seen in FIGURE 3 is that no matter how the door 64 is opened, the switch 25 must be operated. It is essential that switch 25 be placed within the meter coin box 58 in such a position that this will be true. As seen in FIGURE 2, the switches 25 in meters 55 are connected by lines 67 and 68 in series wiring circuit. The wires 67 and 68 can be imbedded in the concrete of sidewalk 57 or may be hidden in the tarred cracks which are normally available in most city streets and sidewalks.

Thus a competent alarm system is shown and described above which will effectively protect parking meter areas in selected vicinities or localities. The control system is preferably centrally located as in a police radio station. The operator at the central station is able to test the system at any time, preferably in the morning, by merely opening the manual switch 21 in any meter circuit. This opening of the primary circuit will release relay 22 and give a thorough check of all the lamp and circuit components in the central control center. He may then reset the system by closing the switches 21 and by closing switches 54 to operate the manual interlock 36. Normal collections will be indicated on the control panel, but will occur in an expected pattern for identification. A casual monitoring of the lamps 40 and 45 and recognition of the audible signals 41 and 47 will provide a constant alert system which is highly effective in the detection of looting of the meters protected by the switches 25. The central operator is instantly aware of each meter 55 being opened and closed since switches 25 will release relay 22 once when the door 64 is opened and again when the door 64 is closed. He is then in a position to identify the locality of the trouble and warn approaching officers of shifts in activity.

Various modifications may be obvious to one skilled in this art after studying the above description and its main objects. However, such modifications are intended to be embraced by this application insofar as they fall within the language of the following claims.

Having thus described my invention, I claim:

1. An alarm system for a plurality of parking meters arranged in a desired pattern, comprising power supply means;
    an individual normally closed switch mounted on the interior of each meter adapted to be opened simultaneously upon the opening of the meter coin box;
    a normally closed primary circuit consisting of said normally closed switches wired in series to one another and to a first relay and to said power supply means, said first relay having normally closed contact point means;
    a normally open secondary circuit comprising a second relay wired in series to said normally closed contact point means and to said power supply means, said second relay having normally open contact point means;
    a first indicator circuit comprising first indicator means wired in series to said normally closed contact point means and to said power supply means;
    and a second indicator circuit comprising second indicator means wired in series to said normally open contact point means and to said power supply means.

2. An alarm system as defined in claim 1 wherein each normally closed switch on the meters is a double throw switch having its alternate terminals wired to one another in the series wiring of the normally closed primary circuit, whereby opening of a meter coin box will result in momentary opening of said primary circuit;
    said second relay having a mechanical interlock adapted to maintain said normally open contact point means in closed position upon activation of said second relay by completion of said normally open secondary circuit;
    and further comprising selectively controllable reset means operatively connected to said mechanical interlock adapted to release said normally open contact point means.

3. An alarm system as defined in claim 1 wherein each normally closed switch on the meters is a double throw switch having its alternate terminals wired to one another in the series wiring of the normally closed primary circuit, whereby opening of a meter coin box will result in momentary opening of said primary circuit;
    said second relay having a mechanical interlock adapted to maintain said normally open contact point means in closed position upon activation of said second relay by completion of said normally open secondary circuit;
    and further comprising selectively controllable reset means operatively connected to said mechanical interlock adapted to release said normally open contact point means;
    said second relay further including normally closed contact points, said normally closed contact points of said second relay being operatively controlled by said mechanical interlock to thereby maintain said normally closed contact points in open position upon activation of said second relay by completion of said normally open secondary circuit;
    said normally closed contact points of said second relay being wired in series to the previously defined components of said normally open secondary circuit.

4. The invention as defined in claim 1 wherein said first indicator means comprises a lamp and an audible instrument wired in parallel to one another with respect to the power supply means.

5. The invention as defined in claim 1 wherein said second indicator means comprises a lamp and an audible instrument wired in parallel to one another with respect to the power supply means.

6. An alarm circuit comprising electric power supply means;
    a primary circuit comprising first relay means and normally closed switch means wired in series relation to each other and to said power supply means, said first relay means including normally closed contact point means;
    a secondary circuit comprising second relay means wired in series to said normally closed contact point means and to said power supply means, said second relay means including normally open contact means;
    first indicator means wired in series to said normally closed contact point means and to said power supply means;
    and second indicator means wired in series to said normally open contact means and to said power supply means.

7. An alarm system as defined in claim 1 wherein each normally closed switch on the meters in a double throw switch having its alternate terminals wired to one another in the series wiring of the normally closed primary circuit, whereby opening of a meter coin box will result in momentary opening of said primary circuit;
    and holding means operatively connected to said second relay operable to maintain said normally open contact point means in closed position upon activation of said second relay by opening of said normally closed primary circuit.

8. An alarm circuit as defined in claim 6 wherein said normally closed switch is a double throw switch having its alternate terminals wired directly to one another, whereby actuation of said switch will result in a momentary opening of the primary circuit;

and holding means operatively connected to said second relay means adapted to maintain said normally open contact point means in closed position upon activation of said second relay means by opening of said normally closed primary circuit.

No references cited.